United States Patent [19]
Laurent et al.

[11] Patent Number: 6,106,928
[45] Date of Patent: *Aug. 22, 2000

[54] EMBOSSED ABSORBENT PAPER HAVING COMBINED PATTERNS

[75] Inventors: Pierre Laurent; Carol Lefebvre Du Grosriez; Gilles Roussel, all of Colmar; Rémy Ruppel, Durrenentzen, all of France

[73] Assignee: Fort James France, Courbevoie, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,767

[22] PCT Filed: Dec. 15, 1995

[86] PCT No.: PCT/FR95/01681

§ 371 Date: Apr. 24, 1997

§ 102(e) Date: Apr. 24, 1997

[87] PCT Pub. No.: WO96/18771

PCT Pub. Date: Jun. 20, 1996

[30] Foreign Application Priority Data

Dec. 16, 1994 [FR] France .................................. 94 15196

[51] Int. Cl.$^7$ ................ B32B 3/28; B32B 3/30; B31F 1/07
[52] U.S. Cl. .......................... 428/152; 162/113; 162/117; 428/166; 428/178; 428/156; 428/172; 428/153; 428/154; 428/161; 428/162; 428/163
[58] Field of Search ..................... 428/161, 162, 428/163, 152, 166, 156, 178, 172, 153, 154; 162/113, 117

[56] References Cited

U.S. PATENT DOCUMENTS

| | | | |
|---|---|---|---|
| 4,307,141 | 12/1981 | Walbrun | 428/132 |
| 4,320,162 | 3/1982 | Schulz | 428/154 |
| 4,376,671 | 3/1983 | Schulz | 156/549 |
| 4,483,728 | 11/1984 | Bauernfeind | 156/209 |
| 4,759,967 | 7/1988 | Bauernfeind | 428/154 |
| 5,328,565 | 7/1994 | Rasch et al. | 162/113 |
| 5,562,805 | 10/1996 | Kamps et al. | 162/117 |
| 5,597,639 | 1/1997 | Schulz | 428/156 |
| 5,609,725 | 3/1997 | Van Phan | 162/117 |

*Primary Examiner*—William P. Watkins, III
*Attorney, Agent, or Firm*—Breiner & Breiner

[57] ABSTRACT

A sheet of paper, in particular for a sanitary paper, consists of at least one ply of absorbent, creped paper of a specific surface weight between 12–35 g/m$^2$ evincing first and second protrusions respectively (10, 2) respectively arrayed in a first and second pattern. The first pattern is composed of pattern elements each constituted by at least one of the first protrusions (10) and is comparatively well spaced apart mutually, while the second so-called background pattern comprises the second protrusions (2) arranged in more compact manner between the pattern elements. The sheet of paper is characterized in that the pattern elements form a graphic pattern while being arrayed at a rate of at most 0.5 element/cm$^2$ and the first protrusions (10) constituting them evince at their top a line-shaped surface with a width between 0.1–2 mm, the second protrusions (2) being arrayed at the rate of at least 30, and preferably 40, protrusions/cm$^2$ and ensuring the essential functional features.

16 Claims, 3 Drawing Sheets

EMBOSSED ABSORBENT PAPER HAVING COMBINED PATTERNS

FIELD OF THE INVENTION

The present invention concerns absorbent paper for sanitary and domestic use and its object is a stratified sheet for such products as toilet paper, paper handkerchiefs, paper napkins or paper towels.

BACKGROUND OF THE INVENTION

The sanitary and domestic paper industry uses a creped paper called cellulose cotton, also tissue paper, in the manufacture of products. The property of this paper to stretch due to its creping is used in embossing it, i.e., to permanently deform the paper at some locations and, in particular, to achieve projections on one side of the sheet.

Regarding sanitary products, the trend of the past years has been to make them softer, more velvety, more attractive while nevertheless preserving or improving their functional features of thickness and strength in particular. The latter features may be affected, whether improved or degraded, by the embossing procedure. Embossing is carried out either on a paper with a high moisture content, that is on a partly moist paper machine, or on low-moisture content paper, that is by transformation into a dry part. The present invention relates to embossing low moisture-content paper.

The most common embossing patterns are repetitive and geometrically based on elements of small cross-sectional protrusions and evincing simple geometric shapes (FIG. 1). One such embodiment is shown in U.S. Pat. No. 3,414,459.

The repeat frequency of the projections of these kind of patterns may be high, the density of the elements ranging from 5 to 60 per $cm^2$ depending on the application being a paper towel or sanitary paper. The surface of the tops of the elementary protrusions may be less than 1 $mm^2$. Such patterns affect mainly the properties relating to the sheet thickness on one hand and to its stiffness and strength on the other. These patterns offer a good tradeoff between the desired feature improvements when the semi-finished product is converted into a finished product and industrial operations, in particular, these patterns permit applying adequate embossing intensity.

On the other hand, much research has shown that these so-called technical patterns are hardly visually attractive to the consumer, in particular, when of low density. This negative perception is compounded by their pronounced diffuseness which makes them anonymous.

Solutions for increasing the visual impact of these sanitary products without thereby degrading the basic paper properties already have been elaborated.

One solution consists in printing decorative patterns before or after embossing. This solution offers the advantage of little affecting the embossing contribution and enhancing product visibility. However, it entails the drawback of putting on the market colored and decorated products whereas most consumers prefer solid colors. Moreover, this solution entails additional equipment and sometimes penalizes the efficiency of the production line.

Another solution of the prior art suggests providing embossing patterns enhancing the visual facet besides the predominant technical patterns. The visual patterns are of a repeat frequency much lower than that of the technical patterns and their unit surface is larger by an order of magnitude. FIG. 2 shows a pertinent sample from the disclosure of European Patent No. 265,298 and of U.S. Pat. No. 4,376,671.

The impact of these patterns on the physical paper properties is less. The rigidity and the thickness of the sheet are little modified. Their main advantage is the signature or at least the potential for differentiation which they offer. On the other hand, this major advantage is linked directly to their legibility or visibility.

To achieve the objective of visual attractiveness, two prior approaches may be noted. The first one employs high embossing density to ensure good marking while the second is restricted to patterns allowing good embossing under usual processing conditions. In the prior art, these two approaches perforce have been implemented simultaneously.

The more the appearance is emphasized, the more complex the geometric shapes. This fact entails less marking power on the sheet and the embossing will be less regular. Accordingly, embossing intensity must be raised if the product characteristics are to be controlled to the desired extent. Thereby, the intrinsic defects of this kind of pattern are amplified relative to embossing regularity and hence regularity of the behavior of the sheet both locally and overall. As a result, the product appearance is degraded and the overall embossing procedure suffers with respect to retaining dimensions, speed and more generally efficiency.

This is the explanation of the tradeoff incurred for these patterns between their marking intensity and their use on an industrial scale. This tradeoff is at the cost of legibility, visibility and the expected improvement in the characteristics entailed by processing the semi-finished goods into finished ones. In practice, the choice will be necessarily in favor of the constraints relating to making the sanitary product while pushing the aesthetic constraints into the background.

These patterns may be called "technical-aesthetic" and because of the factors stated above evince a fairly high repeat frequency and a comparatively compact and closed form. They use simple geometric shapes and, where necessary, shapes assembled to constitute an elementary pattern indefinitely repeated in the longitudinal and transverse directions and of which the orientation is constant. Lastly, as regards a pattern made in conformity with the disclosure of European Patent No. 265,298, the constancy of thickness of the lines forming the element contour is noteworthy.

Another solution of the prior art defines a technical pattern beforehand and reserves regularly spaced zones which as a rule will assume geometric shapes by suppressing picots from this pattern. These zones then are either left as such or else they are decorated with an aesthetic pattern. Occasionally, a printed pattern is also used, but if so at the cost of visibility and hence of legibility of the visual pattern component.

The object of these combinations is to control, on the basis of the technical patterns, the functional factors of thickness, strength and softness in the manner of U.S. Pat. No. 4,320,162. This patent relates to combining two double-depth pattern, namely, a first pattern with elements that are mutually fairly well spaced apart and of substantial depth and a second pattern evincing a shallower depth. In the illustration of this patent, the first pattern is arbitrarily taken as a flower while the second is conventionally identified by picots. The essential features described above for the technical-aesthetic patterns, in particular the near-constant orientation of the primary patterns, are retained in such combinations.

None of these solutions allows fully exploiting the potential offered by the aesthetic patterns as regards the final user.

It is known that value systems (with positive or negative values) can be controlled by judiciously using shapes, motions, directions (for example like logos). Moreover, much research has shown a "halo" phenomenon due to an especially positive perception of one product feature by the consumer decreasing or masking elsewhere the perception of any weak points.

It was impossible to apply such principles to embossing patterns in the prior art.

Foremost the reason is that their essential features of freedom, motion, visibility and legibility to a large extent are incompatible with the constraints entailed from the function and production of sanitary products (thickness, uniform behavior of the sheet, product appearance, speed and production efficiency).

This incompatibility will be pronounced the more these essential features are reinforced by the high embossing intensity required to achieve minimum criteria of economic feasibility in view of the low embossing ability of such free patterns.

The object of the invention is to resolve this problem.

BRIEF DESCRIPTION OF THE INVENTION

The paper of the invention, in particular used in making sanitary paper, is composed of at least one absorbent creped ply of paper with a specific surface weight of 12 to 35 g/m$^2$ and evincing first and second protrusions respectively arrayed in a first and second pattern. The first pattern is composed of pattern elements comparatively well spaced apart from one another and each being constituted of at least one of the first protrusions. The second pattern, called the background pattern, comprising the second protrusions arrayed more tightly between the pattern elements, and this paper of the invention being characterized in that the pattern elements form a first, so-called graphic pattern arrayed in a density of at most 0.5 element/cm$^2$, with the first protrusions constituting the elements evincing at their top a line-shaped surface with a width between 0.1 and 2 mm, and the second protrusions arrayed at a rate of at least 30/cm$^2$, preferably 40/cm$^2$, to ensure the basic functional features relating to embossing.

Thanks to the invention, a combined embossing structure is achieved which offers advantages because of the use of:
- a graphic pattern, that is the element selection is free, without constraint resulting from increasing thickness or absorption by embossing, such a selection thereby being confinable to the single goal of achieving suggestiveness and attractiveness,
- a background pattern ensuring technical embossing contribution, namely thickness and absorption in particular.

Compared with the embodiment shown in the Figures of U.S. Pat. No. 4,376,671, the embossing structure of the invention imparts an eye-pleasing textile look because of the high density of the protrusions of the background pattern. The second protrusions are not easily seen with the naked eye on account of their small size and their surface at the top is less than 1 mm$^2$. Accordingly, they provide contrast for the main pattern. This contrast results especially from the high ratio of the surface of a graphic-pattern element to the surface of a second protrusion, and this ratio in another feature of the invention is larger than 50 and preferably larger than 100, and from their high number per unit surface.

In another feature of the invention, the graphic-pattern elements are arrayed at a rate of no more than 0.2 element/cm$^2$. This feature further increases contrast.

In another feature of the invention, the width of the line-shaped surface is not uniform within a particular graphic-pattern element. Contrary to the case of the technical-aesthetic patterns of the prior art of which a sample is shown in FIG. 2, the invention, which gets rid of the technical pattern constraints, offers a far wider pattern selection providing access to shapes appealing to the consumer or offering higher attractiveness. The expression "line-shaped surface" denotes a surface of which the ratio of length, that is the most direct path inside this surface between the two most spaced-apart points, to the width, that is the mean distance between two arbitrary points either side of this path, exceeds 1. This ratio as a rule will be high. Accordingly, the width may vary along the above cited path. The width ranges from 0.1 to 2 mm. Illustratively, if a pattern element is an alphabet letter, the width may vary in the same manner as the bold and thin strokes of calligraphy.

In another feature of the invention, the second protrusion nearest the graphic-pattern element is situated a distance away from the element at least equal to the distance between two adjacent elements. In this manner, the contrast between the two patterns is improved further.

In another feature of the invention, the sheet of paper may consist of at least two plies of which at least one is embossed in the manner of the invention.

In another feature of the invention, the first protrusions are present on one side of the sheet of paper and the second protrusions on the other side.

In another feature of the invention, the sheet of paper is composed of at least two plies which are embossed jointly.

Another feature of the invention concerns a stratified sheet composed of at least two plies of paper that were embossed separately before being joined. The stratified sheet of paper of the invention is used in particular as sanitary paper and is made up of at least two plies of creped absorbent paper with a specific surface weight of 12 to 25 g/m$^2$. Each ply comprises, on its side facing into the stratum, first and second protrusions, respectively, arrayed in a first and a second pattern. The first pattern is constituted by mutually and relatively well spaced pattern elements of which each is made up of the first protrusions. The second and so-called background pattern comprises the first protrusions arrayed in mutually closer spacing to each other between the pattern elements. The stratified sheet is characterized in that the pattern elements form a graphic pattern by being arrayed at most at the rate of 0.5 element/cm$^2$. The first protrusions constituting the elements evincing at their top a line-shaped surface of which the width ranges from 0.1 to 2 mm and the second protrusions being arrayed at the rate of at least 40/cm$^2$. In particular, the ratio of the surface of a pattern element to the surface of a second protrusion shall exceed 50.

In another feature of the invention, the height of the second protrusions differs from that of the first protrusions and, in particular, it is less. The difference in height between them preferably shall remain less than 0.3 mm. Thanks to this feature, the two sheets can be combined depending only on protrusions projecting beyond the others of which the height is less. The adhesive deposition device, which most of the time is a cylinder mounted parallel to the embossing cylinders, will make contact only with the projecting parts. This is also the case for atomization. Bonding is implemented solely by the projecting elements. Thereby the total adhesive-receiving surface taking part in bonding the sheets is reduced. As a result, the rigidity caused by this combination is lowered.

In another feature of the invention, the height of the second protrusions is less than 0.5 mm.

Other features and advantages of the invention are elucidated in the following description of a non-limiting embodiment of the invention and in relation to the attached drawings.

DETAILED DESCRIPTION OF PRESENTLY PREFERRED EMBODIMENTS

Figure 1:
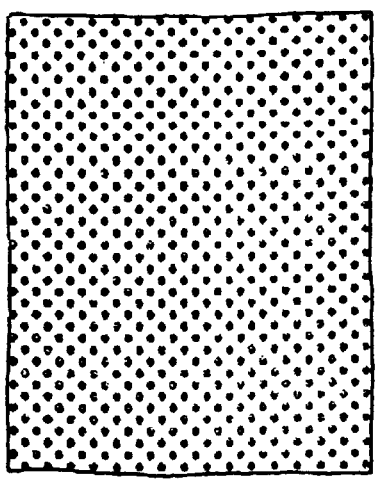
FIGS. 1 and 2 show embossed products with patterns of the prior art.

As already mentioned in the preamble, FIG. 1 shows a topview of an absorbent paper, such as a paper towel or toilet paper, that is commonly available on the market. The plies constituting the sheet are linked to each other by protrusions borne on each ply and facing towards the inside of the sheet. Such an assembly is known, for example from U.S. Pat. No. 3,414,459 for a tip-to-tip combination (the two plies are bonded to one another by the tops of their protrusions) or from U.S. Pat. No. 3,867,225 for a combination wherein they nest into each other and where the protrusions of one ply are situated between the protrusions of the other ply and the linkage implemented by the tops of the protrusions of one ply with the unembossed parts of the other ply. In the case of the embodiment of FIG. 1, these protrusions assume the shape of tips of circular, oval or polygonal cross-section. The number of protrusions per unit surface depends on the desired product thickness. Illustratively, a paper towel which demands high absorption may uniformly evince 10 protrusions/cm$^2$.

Figure 2:
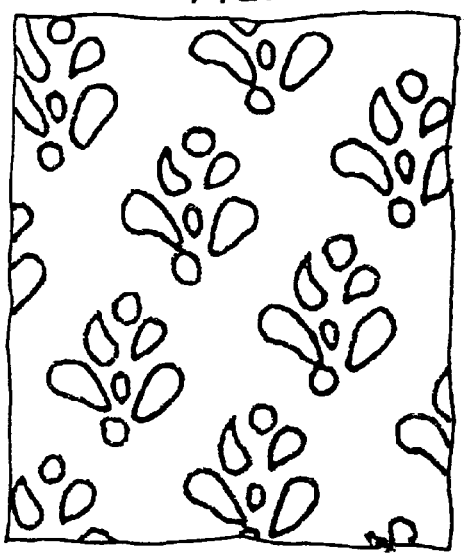

FIG. 2 shows an embodiment of the prior art with a technical-aesthetic pattern of the type disclosed in European Patent No. 265,298 for a toilet paper which is marketed by applicant under the trademark LOTUS PETITE FLEUR. Each pattern element is a flower and is defined by a plurality of elementary protrusions in the form of closed line-shaped embossings. The line thickness is slight and is about 1 mm. The two plies are combined in the tip-to-tip mode. Nevertheless, the pattern selection is fairly restricted because in such embodiments a functional role rather than a merely decorative one is also desired, in such a way that the pattern can be intensively embossed to achieve maximum volume. As described in U.S. Pat. No. 4,320,162, lower protrusions also may be used between the elementary patterns in order to endow the sheet with a framework and to increase its resistance to crushing.

Figure 3:
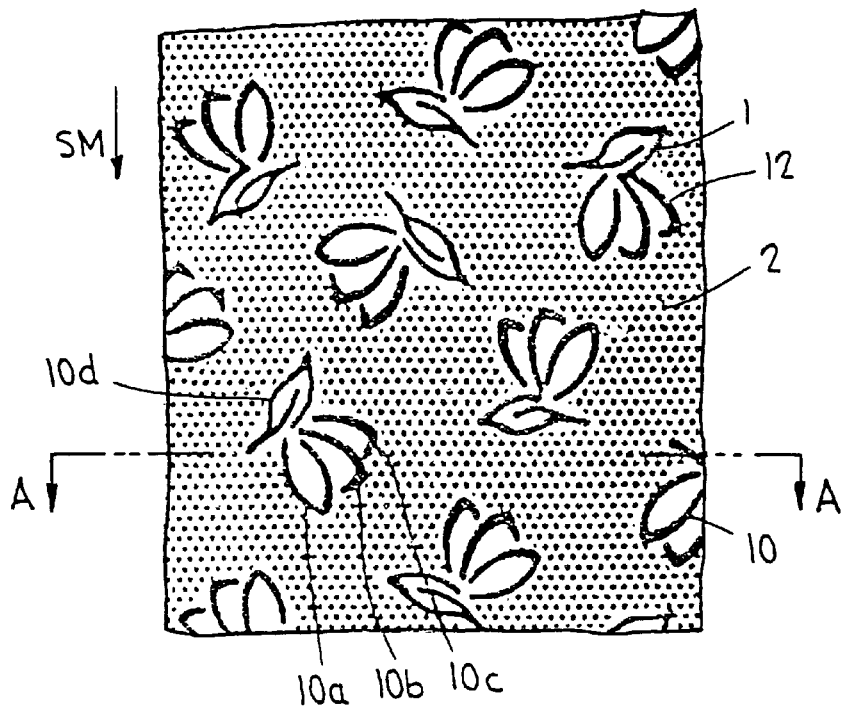
FIG. 3 shows a first embodiment of a pattern of the present invention.
Figure 5:
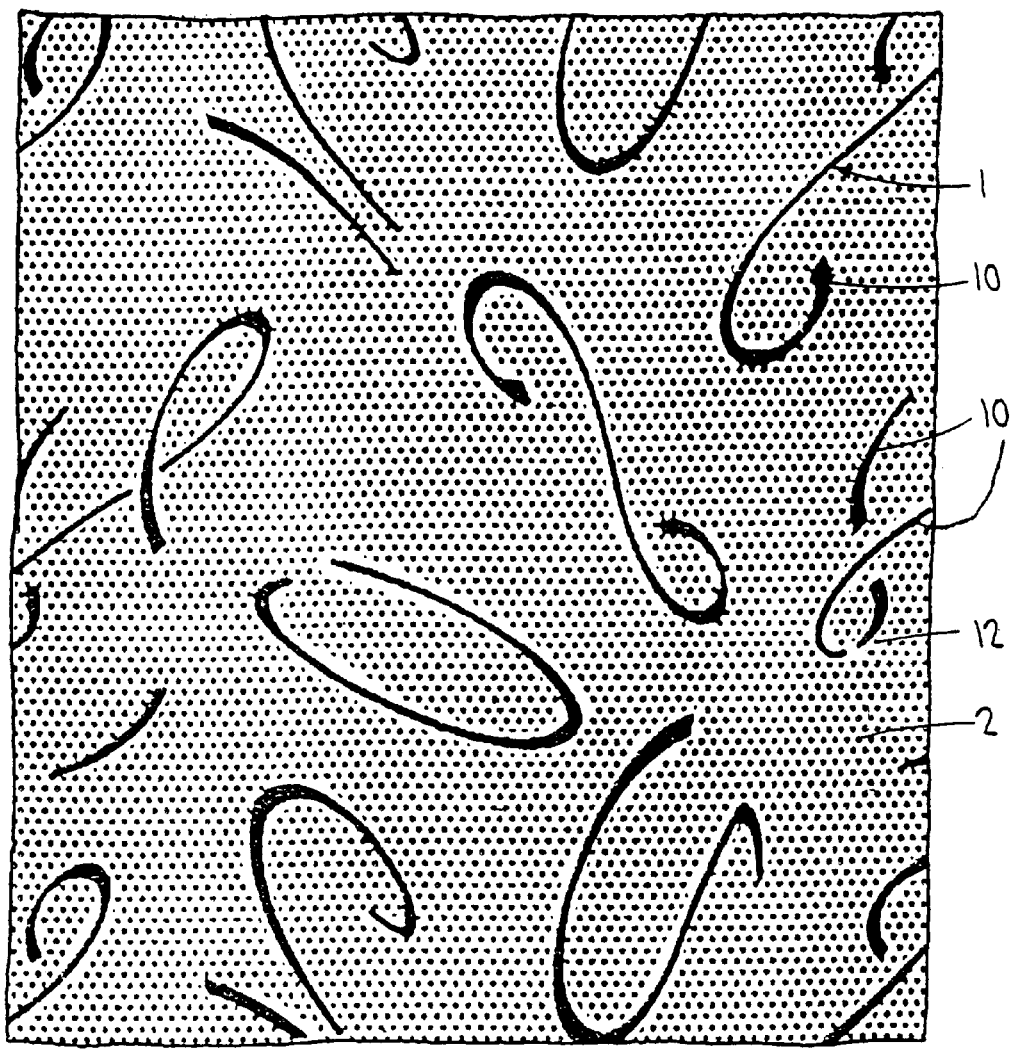
FIG. 5 shows a second embodiment of a pattern of the invention.
Figure 6:
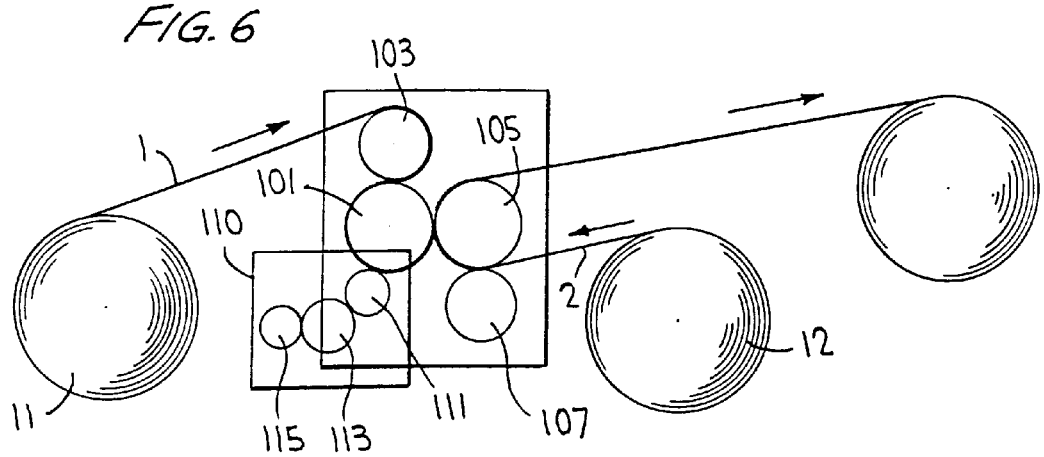
FIG. 6 shows a schematic of embossing equipment suitable for making a product wherein the embossing pattern conforms to the invention.

FIGS. 3 and 5 are topviews of products of the invention. The pattern elements 1 of the main graphic pattern consist of elongated first protrusions 10 combining with one another so as to represent a flower in the embodiment of FIG. 3 with protrusions 10a, 10b, 10c, 10d, and letters in FIG. 5. Other patterns such as feathers suggesting softness and flexibility also are possible. These protrusions are between 0.1 and 2 mm wide. Such a width is not uniform. The width renders bold and fine strokes. Moreover, the pattern elements point in different directions from the direction of advance SM. FIGS. 3 and 5 also show that the directions of the pattern elements 1 all are different. By ensuring that these pattern elements shall not be instrumental in imparting thickness to the sheet, it is possible to select far more freely a design. It is enough to control the pressure level applied by the rubber cylinder to implement embossing at a value much lower than the maximum possible when it is desired to make the sheet thick. As the sheet then is much less stressed and undergoes only low mechanical strains, it will not fold or tear in spite of the use of protrusions of which the contour presents reversal points and of which the distribution of surfaces coming into contact with the sheet is not balanced inside a perimeter circumscribing the pattern element. Between these comparatively well spaced-apart pattern elements, preferably no more than 1 element/5 cm$^2$, there are shown the second protrusions 2. The second protrusions evince a tip shape, or the shapes of frustra of cone or pyramid of a height less than 0.5 mm, and preferably less than 0.1 mm, with a polygonal cross-section, for example being diamond-shaped, circular or elongated in the direction of advance or in the transverse direction. In particular, the height differences between the protrusions 2 and the first protrusions shall be 0.3 mm. The area of the top of the tips is less than 1 mm$^2$. As shown in the figure, the second protrusions are regularly arrayed between the pattern elements 1. In the example shown, the protrusions are arrayed staggered behind each other at a regular pitch in both the direction of advance and the transverse direction. Their high density imparts a textile appearance to the sheet. To achieve this effect, their number must be at least 30 and preferably 40/cm$^2$, in particular it can be higher, for example 60 to 80/cm$^2$ to enhance this appearance. Moreover, the ratio of the surface of a pattern element 1 to the surface of a second protrusion 2 preferably is higher than 50. A higher ratio, for example larger than 100, further enhances the contrast. By arraying the second protrusions to create protrusion-free zones 12 between the pattern elements and the background pattern, the contrast is raised and the visual appearance improved. To implement this free zone 12, it suffices to eliminate or suppress the protrusions 2 directly adjoining the protrusions 10 of the pattern elements on the embossing cylinders and this over a distance which is at least the pitch of the background pattern measured both in the direction of advance and in the transverse direction.

Figure 7:
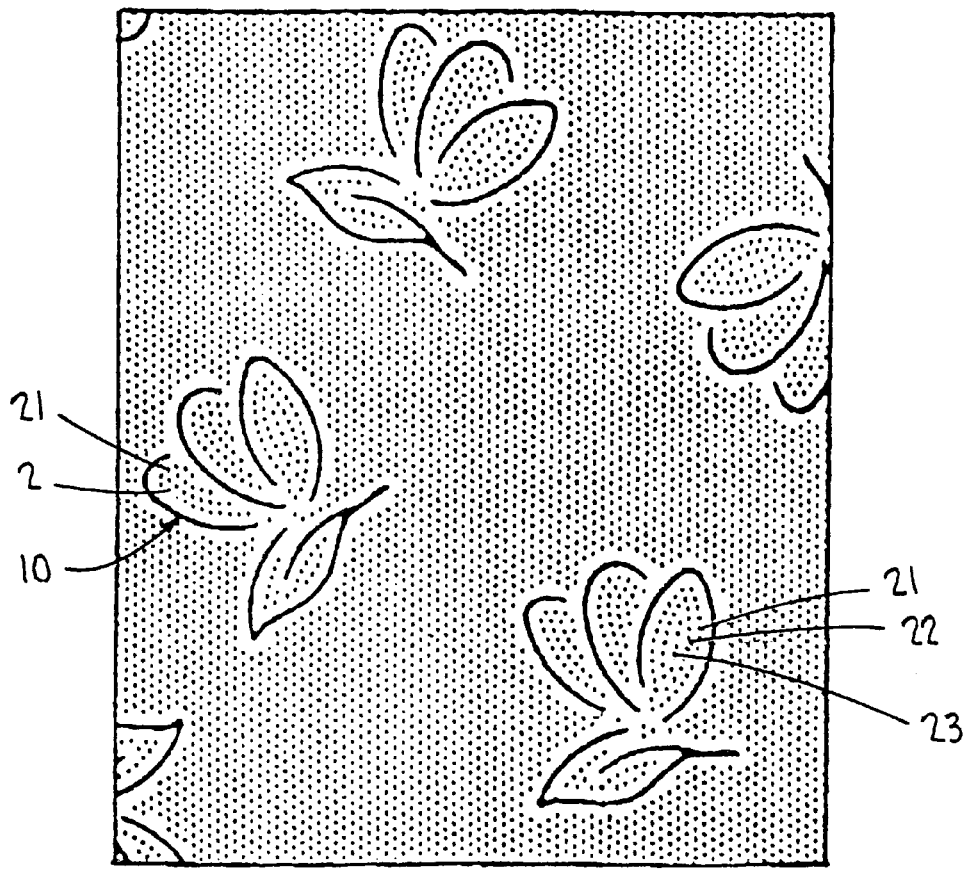
FIG. 7 shows a third embodiment of a pattern of the invention.

FIG. 7 shows another embodiment of the invention making it possible to further enhance the visibility and legibility of the pattern elements 1. In this embodiment, a number of second protrusions 2, preferably situated near the protrusions 10, are arrayed along alignments 21 parallel to the contours of the pattern elements 1. The alignment 21 is understood to be the set of protrusions on this alignment 21, two adjacent protrusions on such an alignment 21 being mutually apart by a distance less than that separating them from other protrusions to their sides. The distribution of these protrusions is dissonant from the regular distribution of the protrusions of the background pattern and enhances the outline of the pattern elements 1 and thus improves their legibility. The distance between two protrusions along these alignments 21 preferably are as small as possible in order to make them look like virtually continuous lines. The protrusions being made by embossing on cylinders fitted with frustoconical needles, the minimum distance possible is that separating two adjacent needles with touching bases. These alignments are arrayed on one or on both sides of the protrusions 10. There can be a single alignment 21. However, preferably at least two are used. If the pattern element 1 is defined by a closed line as shown in FIG. 7, then preferably there are as many alignments as allowed by the defined space. Each pattern of FIG. 7 contains three alignments 21, 22, 23.

Figure 4:
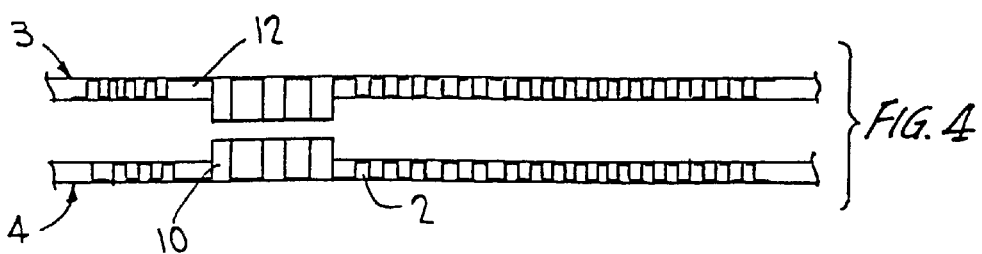
FIG. 4 shows a section along A—A of FIG. 3.

In the case of a stratified two-ply sheet wherein the plies were separately embossed before being assembled, as shown in FIG. 4, the first protrusions preferably are higher than the second ones. In this manner, it is possible to easily join the two sheets only by the first which are placed in the tip-to-tip position. A more pliant stratified sheet is thus achieved, one more pleasant to the touch, than is a sheet bonded at a majority of its protrusions. However, it is possible as well to implement a bond between the sheets without unduly stiffening the assembly by atomizing a slight amount of adhesive onto one of the plies. In that instance, a double height between the first and second protrusions is not required and each of the plies shall evince a specific surface weight between 12 and 25 g/m$^2$.

The invention also concerns a sheet with one ply or with several jointly embossed plies in order to achieve the appearance for example of FIG. 3 which in cross-section, however, only shows one of the plies of FIG. 4.

Next, equipment known per se and allowing the manufacture of the stratified product of the invention is described. FIG. 5 shows a first pair of cylinders 101, 103 comprising an engraved metal cylinder 101 at the surface of which are implanted raised elements of a geometry corresponding to the desired embossing. The metal cylinder is driven in rotation about a horizontal axis and is combined with a parallel rubber cylinder 103 with which it subtends a compressive gap 101, 103. When passing through this gap, a creped, absorbent sheet of paper, such as cellulose cotton or tissue paper, undergoes permanent deformations because of the pressure applied by the rubber on the paper resting on the raised elements of the rigid cylinder. The paper then adopts the shape. Depending on the embossing intensity, the paper more or less enters the spaces between the raised elements.

To implement the desired embossing, the raised elements are distributed according to two patterns: a first pattern with the first protrusions per se defining pattern elements 1 and a second pattern with the second protrusions.

The equipment comprises a second pair of embossing cylinders, namely a metal cylinder 105 of the same diameter as and rotating in the same horizontal plane as the cylinder 101, and cooperating with a rubber cylinder 107 to carry out the embossing.

Between them, the cylinders 101 and 105 subtend a compressive gap 101–105 and they are driven at synchronized but opposite speeds of rotation in order to roll on each other without slippage.

The equipment also comprises an adhesive-depositing system 110 with a depositing cylinder 111 made of rubber or of another equivalent material, which rests against the cylinder 101 upstream of the compressive gap 101–105. A transfer cylinder 113 moves the adhesive from an immersion cylinder 115 onto the depositing cylinder 111. The immersion cylinder 115 removes the adhesive from an omitted tub.

The paper sheets to be combined are fed from spools 21, 22. The sheet 1 is guided around the rubber cylinder 103 and moves into the gap 101–103 from which it exits in embossed form having hugged the raised surface of the metal cylinder 101. The depositing cylinder 111 deposits the adhesive in metered amounts onto the surface of the flat-top protrusions of the sheet.

The second sheet 2 undergoes a similar treatment by passing through the gap 105–107 after which it is combined with the sheet 1 in the gap 101–105. The resulting stratified sheet is then converted into the finished product.

In the case of a single-ply sheet or of a sheet with several plies that were embossed jointly, obviously one pair of cylinders 101, 103 is used.

Figure 8:
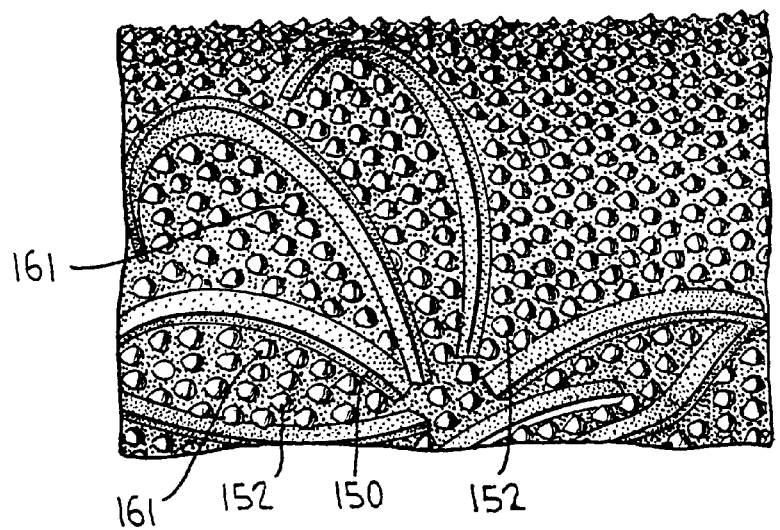
FIG. 8 shows an enlarged detail of the surface of an embossing cylinder.

FIG. 8 shows a portion of the surface of one of the embossing cylinders 101 or 105 with raised first elements 150. These elements are elongated. These elements evince a flat top of which the width varies along the element. The width is at least 0.1 mm and at most 2 mm. On the other hand, the height from the base of the engraving is substantially constant. Second raised elements 152, assuming the shape of a frustrum of cone or pyramid with a flat top in the form of a small circle of 1 mm$^2$, are arranged on either side of the elements 150. The tops of the elements 150 are lower. The difference in level between the elements is about 0.3 mm. On one side of the first protrusions 150, the second raised elements 152 are arranged along alignments 161 parallel to the curvature of the element 150. The distance between the alignment 161 of the element 150 depends on the mean width of the element 150.

During embossing, the cellulose-cotton sheet is pressed by a cylinder with a deformable cladding, such as rubber, onto these raised elements of which it follows the shape. Because of the shallowness of the combined pattern engraving and the presence of the background pattern, the sheet is spared excessive stresses concerning the graphic pattern.

What is claimed is:

1. A sheet of paper comprising at least one ply of creped absorbent embossed paper having a surface weight of between 12 and 35 g/m$^2$ and including first embossed protrusions and second embossed protrusions arranged respectively in a first pattern and in a second pattern and having corresponding cavities on a side opposite to that side having said first protrusions and said second protrusions, the first pattern comprising spaced pattern elements each made up of at least one of said first protrusions, and the second pattern comprising said second protrusions arranged between said pattern elements of the first pattern, wherein the pattern elements of the first pattern form a graphic pattern by being distributed at most at a rate of 0.5 element/cm$^2$, the first protrusions constituting the pattern elements have at their top a line-shaped surface with a width between 0.1 and 2 mm, and the second protrusions are arranged at a rate of at least 30 protrusions/cm$^2$.

2. Sheet of paper as claimed in claim 1 wherein a ratio of surface area of a pattern element of the first pattern to surface area of a second protrusion is larger than 50.

3. Sheet of paper as claimed in claim 2 wherein said ratio exceeds 100.

4. Sheet of paper as claimed in any one of claims 1, 2 or 3 wherein said pattern elements of the first pattern are distributed at a rate of no more than 0.2 element/cm$^2$.

5. Sheet of paper as claimed in claim 1 wherein the width of said line-shaped surface varies within one pattern element of the first pattern.

6. Sheet of paper as claimed in claim 1 wherein distance between a second protrusion and a first protrusion of a pattern element equals at least a distance as between two second protrusions adjacent to said pattern element.

7. Sheet of paper as claimed in claim 1 wherein at least two of the second protrusions situated near a first protrusion are arrayed along at least one alignment parallel to that first protrusion.

8. Sheet of paper as claimed in claim 7 wherein the pattern elements of the first pattern define closed surfaces, and said at least one alignment are situated within at least one of the pattern elements.

9. Sheet of paper as claimed in claim 1 wherein the first protrusions are present on a first side of said sheet and the second protrusions are present on a second side of said sheet.

10. A stratified sheet of paper comprising two absorbent creped embossed paper plies with each ply having a surface weight of between 12 and 25 g/m$^2$ and each having on one side first embossed protrusions and second embossed protrusions arrayed respectively in a first pattern and in a second pattern and having corresponding cavities on an opposite side, said side of each ply containing said first protrusions and said second protrusions facing inward the stratified sheet of paper, the first pattern comprising pattern elements wherein each pattern element constitutes said first protrusions and is spaced from one another, and the second pattern comprising said second protrusions arranged between said pattern elements of said first pattern, wherein at least one of the plies is made in conformity with a sheet of paper as claimed in claim 1.

11. Stratified sheet of paper as claimed in claim 10 wherein height of the second protrusions differs from height of the first protrusions such that height differential is less than 0.3 mm.

12. Stratified sheet of paper as claimed in claim 11 wherein the height of the second protrusions is less than the height of the first protrusions.

13. Stratified sheet of paper as claimed in either claim 11 or 12 wherein the two plies are mutually bonded by adhesive at tops of the first protrusions.

14. Stratified sheet of paper as claimed in claim 12 wherein the height of the second protrusions is less than 0.5 mm.

15. Stratified sheet of paper comprising at least two creped absorbent embossed paper plies having a surface weight of between 12 and 25 g/m$^2$ and placed one on the other, each having on one side first embossed protrusions and second embossed protrusions and having corresponding cavities on an opposite side, said one side of each ply pointing inward the stratified sheet, said first protrusions and said second protrusions being arranged respectively in a first pattern and a second pattern, the first pattern comprising pattern elements each constituted by at least one of said first protrusions and being spaced apart from one another, and the second pattern comprising said second protrusions arranged between said pattern elements of the first pattern, wherein the pattern elements of the first pattern form a graphic pattern and are distributed on the sheet's surface at a rate of no more than 0.5 element/cm$^2$, the first protrusions constituting said pattern elements have at their top a line-shaped surface of a width between 0.1 and 2 mm and the second protrusions are arrayed at a rate of at least 30 protrusions/cm$^2$.

16. Sheet of paper as claimed in claim 1 wherein height of the second protrusions differs from height of the first protrusions such that a height differential of less than 0.3 mm is present.

* * * * *